United States Patent [19]
Ikeda

[11] Patent Number: 5,697,284
[45] Date of Patent: Dec. 16, 1997

[54] BOOSTER

[75] Inventor: Masahiro Ikeda, Saitama-Ken, Japan

[73] Assignees: Jidosha KiKi Co., Ltd., Tokyo; Toyota Jidosha Kabushiki Kaisha, Aichi-ken, both of Japan

[21] Appl. No.: 537,285

[22] Filed: Sep. 27, 1995

[30] Foreign Application Priority Data

Oct. 14, 1994 [JP] Japan .................................. 6-276135

[51] Int. Cl.$^6$ .................................................. F15B 9/10
[52] U.S. Cl. ........................................................ 91/376 R
[58] Field of Search ............................. 91/369.1, 376 R

[56] References Cited

U.S. PATENT DOCUMENTS

| | | |
|---|---|---|
| 2,735,268 | 2/1956 | Stelzer . |
| 4,598,625 | 7/1986 | Belart . |
| 4,633,760 | 1/1987 | Wagner . |
| 4,718,327 | 1/1988 | Myers ............... 91/376 R X |
| 4,813,338 | 3/1989 | Mortimer et al. . |
| 4,898,073 | 2/1990 | Seip et al. . |
| 4,934,249 | 6/1990 | Gautier et al. ........ 91/376 R X |
| 4,970,940 | 11/1990 | Boehm et al. . |
| 5,014,597 | 5/1991 | Rueffer et al. . |
| 5,079,991 | 1/1992 | Cadeddu ............... 91/376 R |
| 5,115,718 | 5/1992 | Gautier et al. . |
| 5,323,685 | 6/1994 | Wagner . |
| 5,337,650 | 8/1994 | Uyama . |
| 5,493,946 | 2/1996 | Schlueter . |

FOREIGN PATENT DOCUMENTS

| | | |
|---|---|---|
| 1925 524 | 5/1969 | Germany . |
| 60-188605 | 9/1985 | Japan . |
| 2-99061 | 8/1990 | Japan . |
| 113966/92 | 4/1992 | Japan . |
| 1 515 939 | 6/1978 | United Kingdom . |
| 2 060 100 | 4/1981 | United Kingdom . |
| 2 148 427 | 5/1985 | United Kingdom . |

OTHER PUBLICATIONS

Two sheets of drawings containing Figures 1 and 2 from pending Ser. No. 08/429,661, filed on Apr. 27, 1995, owned by Jidosha Kiki Co., Ltd.

*Primary Examiner*—Hoang Nguyen
*Attorney, Agent, or Firm*—Flynn, Thiel, Boutell & Tanis, P.C.

[57] ABSTRACT

A first seat of a valve element which forms a vacuum valve is axially spaced from a second seat of the valve element which forms an atmosphere valve. The diameter of the first seat is reduced so as to be on the same order as the diameter of the second seat. This allows the load which must set into a spring that is used to maintain a hermetic seal around the first seat to be reduced, in turn allowing an input which must be applied to initiate the operation of the brake booster to be reduced.

5 Claims, 2 Drawing Sheets

BOOSTER

FIELD OF THE INVENTION

The invention relates to a booster as may be used in a brake of an automobile or the like, and more particularly, to an improvement of a valve mechanism thereof.

DESCRIPTION OF THE PRIOR ART

A booster is known in the art including a tubular valve body slidably disposed within a shell, a power piston mounted on the valve body, a constant pressure chamber and a variable pressure chamber defined across the power piston, an annular, first valve seat formed around the inner periphery of the valve body, a valve plunger slidably fitted into the valve body, an annular, second valve seat formed on the valve plunger, a valve element disposed within the valve body and urged by the resilience of a first spring to be seated upon either the first or the second valve seat, an input shaft having its one end connected to the valve plunger and its other end connected to a brake pedal, a second spring for positioning the input shaft at its inoperative position, a vacuum valve formed by a combination of the first valve seat and a first seat of the valve element which engages with and disengages from the first valve seat, a constant pressure passage for causing a space located radially outward of the vacuum valve to communicate with the constant pressure chamber, an atmosphere valve formed by a combination of the second valve seat and a second seat of the valve element which engages with or disengages from the second valve seat, a pressure passage for causing a space located radially inward of the atmosphere valve to communicate with a source of pressure fluid, and a variable pressure passage for causing a space located intermediate the vacuum and the atmosphere valve to communicate with the variable pressure chamber.

In a conventional booster as described, when the booster is operated, the atmosphere valve is opened while the vacuum valve is closed. This causes the constant pressure chamber to assume a negative pressure while the atmospheric pressure is introduced into the variable pressure chamber. A negative pressure is introduced into the space located radially outward of the first seat through the constant pressure passage while the atmosphere is introduced into the space located radially inward of the first seat because the atmosphere valve is opened. At this time, it will be seen that the negative pressure acts upon the front side of the valve element in a region located radially outward of the first seat while the atmospheric pressure acts upon the rear side of the valve element. Accordingly, a pressure differential acting upon the valve element causes the valve element to be urged forwardly. However, the magnitude of such urging force is not large enough to maintain the hermetic seal of the first seat, which is maintained by the first spring.

It is to be noted that in a conventional booster as mentioned, the first and the second seat of the valve element are formed in a concentric manner, with the first seat having a diameter which is chosen greater than that of the second seat. Accordingly, when the booster is operated, a pressure responsive area of the valve element upon which the pressure differential acts becomes reduced, with a consequent increase in the load with which the first spring must be set in order to maintain the hermetic seal around the first seat of the valve element. It is seen that this results in a disadvantage that an input which is required to initiate the operation of the booster increases.

SUMMARY OF THE INVENTION

In view of the foregoing, in accordance with the invention, a booster as mentioned is characterized in that the first and the second seat of the valve element are formed so as to be spaced in the axial direction, and a diameter of the first seat is reduced to the same order as the diameter of the second seat.

With this construction, because the diameter of the first seat is reduced to be on the same order as the second seat, when the booster is operated, a pressure responsive area of the valve element which is subject to the pressure differential thereacross can be increased, thus allowing the load with which the first spring must be set to maintain the hermetic seal of the first seat to be reduced. This enables an input which is required to initiate the operation of the booster to be reduced as compared with the prior art.

Above and other objects, features and advantages of the invention will become apparent from the following description of several embodiments thereof with reference to the drawings.

DETAILED DESCRIPTION OF EMBODIMENTS

Figure 1:
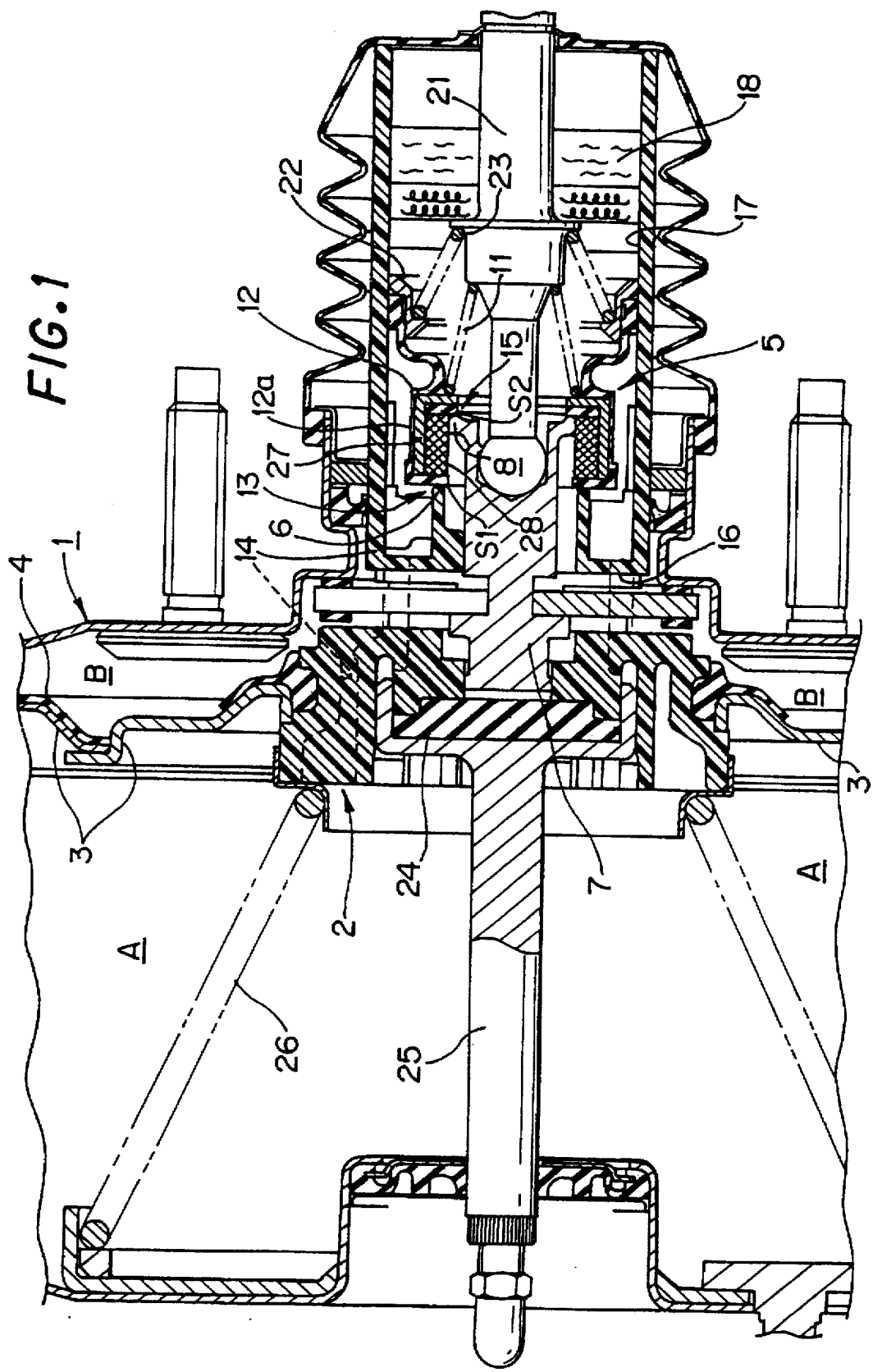
FIG. 1 is a cross section of one embodiment of the invention.

Referring to the drawings, several embodiments of the invention will now be described. In FIG. 1, a brake booster includes a shell 1 in which a substantially tubular valve body 2 is slidably disposed. A power piston 3 is mounted around the valve body 2, and a diaphragm 4 is applied to the back surface of the power piston 3, thus dividing the interior of the shell 1 into a constant pressure chamber A and a variable pressure chamber B.

A valve mechanism 5, which switches a fluid circuit to and from the constant pressure chamber A and the variable pressure chamber B, is disposed within the valve body 2, and comprises an annular, first valve seat 6 which is formed around the inner peripheral surface of the valve body 2, an annular, second valve seat 8 formed on the right end of a valve plunger 7 which slidably disposed within the valve body 2, and a valve element 12 which is urged from the right, as viewed in FIG. 1, by the resilience of a spring 11 to be seated upon either valve seat 6 or 8.

A combination of the first valve seat 6 and a first seat S1 of the valve element 12 which engages with or disengages from the first valve seat 6 constitutes a vacuum valve 13. A space located radially outward of the vacuum valve 13 communicates with the constant pressure chamber A through a constant pressure passage 14 formed in the valve body 2. A negative pressure is normally introduced into the constant pressure chamber A through a tubing, not shown, which introduces a negative pressure.

A combination of the second valve seat 8 and a second seat $2 of the valve element 12 which engages with or disengages from the second valve seat 8 constitutes an atmosphere valve 15, and a space located intermediate the atmosphere valve 15 and the vacuum valve 13 communicates with the variable pressure chamber B through a variable pressure passage 16 formed in the valve body 2.

A space located radially inward of the atmosphere valve 15 communicates with the atmosphere, acting as a source of pressure, through a pressure passage 17 formed in the valve body 2, with a filter 18 disposed in the pressure passage 17.

The right end of the valve plunger 7 is pivotally connected to the forward end of an input shaft 21, the other end of which is connected to a brake pedal, not shown. The input shaft 21 has a step formed thereon, and one end of the valve element 12 is secured to the valve body 2 by a retainer 22. A spring 23 which is set to a given load is disposed across the step of the input shaft 21 and the retainer 22, thus resiliently urging the input shaft 21 rearwardly so that it remains at rest at its inoperative position shown.

A reaction disc 24 is disposed to the left of the valve plunger 7, and is fitted over the right end of a push rod 25, the left end of which slidably extends through a front wall of the shell 1 to the outside thereof for connection with a piston of a master cylinder, not shown.

The valve body 2 is urged rearwardly by a return spring 26, and is normally located at its inoperative position shown. When the brake booster is inoperative as shown, the vacuum valve 13 is open while the atmosphere valve 15 is closed. Under this condition, the front side of the valve element 12 is subject to a negative pressure while the rear side of the valve element 12 is subject to the atmospheric pressure. Accordingly, the resulting pressure differential across the valve element 12 urges the valve element 12 forwardly. However, since the resilience of the spring 23 is greater than the force with which the valve element 12 is urged forwardly due to the pressure differential, the valve element 12 and the input shaft 21 remain at rest at their inoperative positions shown. The described construction and resulting operation remain unchanged from that known in the art.

In the present embodiment, an input which must be applied to the input shaft 21 to initiate the operation is reduced, by improving the valve element 12 and the valve plunger 7 so that the load with which the spring 11 is set may be reduced.

Specifically, the valve element 12 of the present embodiment includes the first seat S1 and the second seat S2 which are axially spaced apart by a given distance, with a cylindrical portion 12a connecting the first seat S1 and the second seat S2 together. A substantially cup-shaped support member 27 is integrally mounted around the inner periphery of the cylindrical portion 12a so as to maintain its configuration.

The left end of the support member 27 is covered by the front end of the cylindrical portion 12a which extends radially inward, the first seat S1 being defined by the inner periphery of such portion which is covered. An annular rubber is adhesively bonded over the left end face of a radial portion of the support member 27 or its right end in an integral manner, with the second seat S2 being defined by the inner periphery of the rubber. In the present embodiment, the first seat S1 has a diameter which is equal to or slightly greater than the diameter of the second seat S2. A cylindrical muffler member 28, which permits the passage of the atmosphere therethrough, is fitted around the inner periphery of the support member 27.

On the other hand, the valve plunger 7 of the present embodiment is formed with a radial portion in the form of a flange at its right end which had an annular projection around the outer periphery of the right-hand side of the radial portion, which defines the second valve seat 8. The second valve seat 8 is situated inside the muffler member 28 so as to be capable of moving laterally relative to the muffler member 28 at a position radially inward thereof, but adjacent to the inner periphery thereof.

When the second valve seat 8 and the second seat S2 of the valve element 12 are removed from each other upon operation of the brake booster, or when the atmosphere valve 15 is opened, the atmosphere which passes through the atmosphere valve 15 flows inside the muffler member 28 to be introduced into the variable pressure chamber B through the variable pressure passage 16. In the present embodiment, as a result of providing the muffler member 28, there is no sound absorbing material which is disposed within the pressure passage 17 to present a resistance to the rate of introduction of the atmosphere.

In operation, the choice of the diameter of the first seat S1 which is on the same order as the diameter of the second seat S2 allows a pressure responsive area of the valve element 12 which is subject to the pressure differential, developed across the valve element 12 upon operation, to be increased. This allows the load with which the spring 11 must be set in order to maintain the hermetic seal of the seat S2 to be reduced, thereby allowing the input which is required to be applied to the input shaft 21 to initiate the operation of the brake booster to be reduced. In contrast to the present embodiment, in the conventional arrangement, a valve element 12 includes a first seat S1 and a second seat S2 which are formed in a concentric manner, whereby the first seat S1 has a diameter greater than that of the second seat S2. With such a valve element 12 of the prior art, a pressure responsive area over which a pressure differential developed across the valve element 12 acts upon the valve element 12 upon operation becomes reduced, requiring an increased load with which the spring 11 must be set, with concomitant disadvantage that the input required to initiate the operation of the brake booster must be increased as has been recognized.

In addition, in the embodiment described above, there is no sound absorbing material which is disposed within the pressure passage 17 to present a resistance to the rate of introduction of the atmosphere. This prevents any reduction in the response upon operation, by an amount corresponding to the absence of such sound absorbing material.

Second Embodiment

Figure 2:
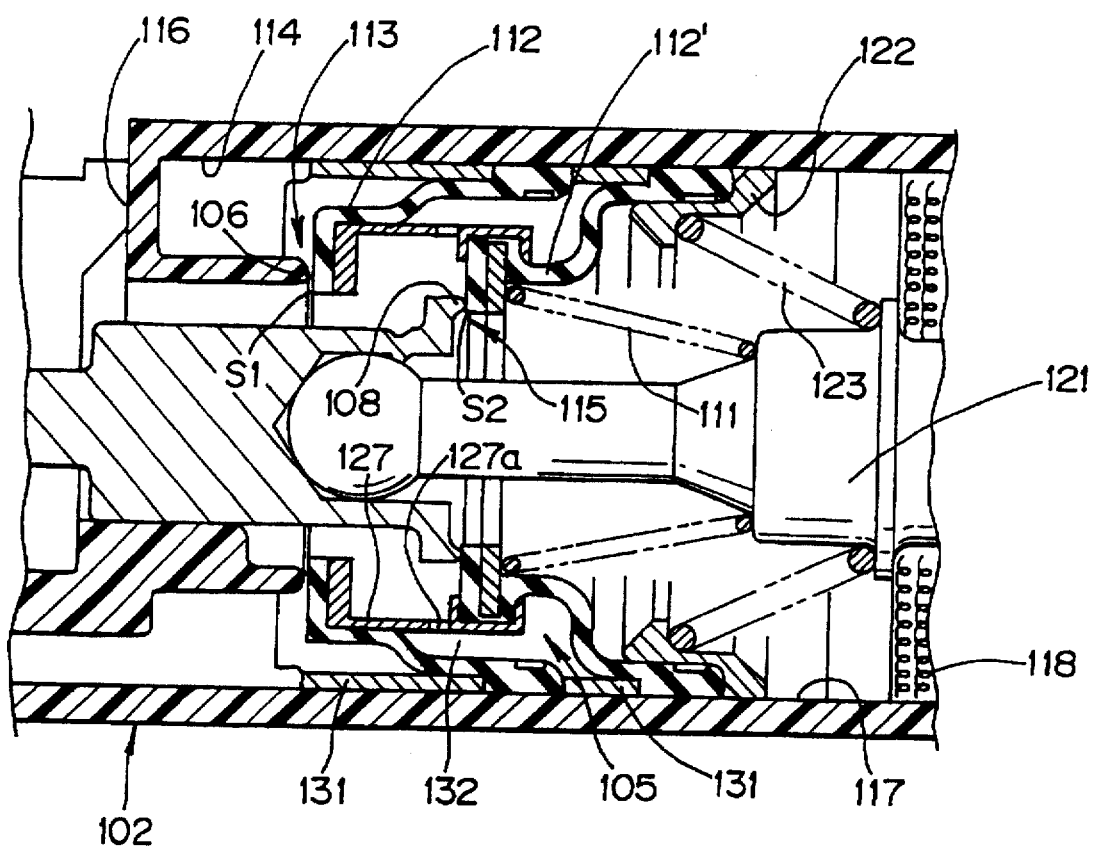
FIG. 2 is a cross section of another embodiment of the invention.

FIG. 2 shows a second embodiment of the invention. In the first embodiment, a single valve element 12 is disposed within the valve body 2. By contrast, in the second embodiment, a pair of valve elements 112, 112' are disposed, axially spaced from each other, within a valve body 102. The both valve elements 112, 112' are integrally connected together by a tubular support member 127. One end of each of the valve elements 112, 112' is secured to the inner periphery of the valve body 102 by means of a pair of front and rear spacers 131 and a retainer 122, which is identical to that used in the first embodiment mentioned above. At its front end, the support member 127 has its outer periphery fitted around the front portion of the valve element 112, while the outer periphery of the valve element 112' at its front end is fitted in an annular groove which is formed in the rear portion of the support member 127. In this manner, the both valve element 112, 112' are connected together integrally so that they may be axially moved back and forth in synchronized manner.

A first seat S1 is defined by the inner periphery of the front end face of the valve element 112, and a second seat S2 is defined by the inner periphery of the front end face of the valve element 112'. Again, the diameter of the first seat S1 is chosen to be substantially equal to or slightly greater than the diameter of the second seat S2.

In the second embodiment, an annular pressure chamber 132 is formed by a combination of the outer periphery of the support member 127, the inner periphery of the valve body 102 and the both valve elements 112, 112', and communicates through a plurality of through-openings 127a, which are formed in the support member 127 in its axially median portion, with a space located radially inward of the support member 127, or a space situated between a vacuum valve 113 and an atmosphere valve 115. In the inoperative condition of the brake booster, a negative pressure is introduced into the pressure chamber 132, but upon operation of the brake booster which is initiated by a forward movement of the input shaft 21, the atmosphere passing through the open atmosphere valve 115 is partly introduced into the pressure chamber 132, thus allowing the bias which is applied when the first seat S1 seats upon a first valve seat 106 to be increased.

In the second embodiment, the muffler member 28 which was disposed around the inner periphery of the support member 27 in the first embodiment is not provided, and a radial passage 116 is located above the axis. In other respects, the arrangement is similar to the first embodiment, and accordingly, corresponding parts are designated by like numerals as used in the first embodiment, to which 100 is added.

With the second embodiment thus constructed, since the first seat S1 has a diameter which is substantially equal to the diameter of the second seat S2, the load with which a spring 111 must be set can be reduced in the similar manner as before. In addition, in the second embodiment, the bias applied to the first seat S1 when it engages the first valve seat 106 can be increased by the provision of the pressure chamber 132, contributing to a further reduction in the input which must be applied to the input shaft 121 in order to initiate the operation.

Additionally, the muffler member 28 shown in the first embodiment is omitted in the second embodiment. This allows the flow rate of the atmosphere when the brake booster is operated can be increased by omitting the muffler member 28, thus improving the response upon operation.

While the embodiments have been described as applied to a brake booster of a single type, it should be understood that the invention is equally applicable to a brake booster of tandem type or triple type.

While the invention has been shown and described above in connection with several embodiments thereof, it should be understood that a number of changes, modifications and substitutions therein will readily occur to one skilled in the art from the above disclosure without departing from the scope and spirit of the invention defined by the appended claims.

What is claimed is:

1. A booster including a tubular valve body slidably disposed within a shell, a power piston mounted on the valve body, a constant pressure chamber and a variable pressure chamber defined across the power piston, an annular, first valve seat formed around the inner periphery of the valve body, a valve plunger slidably fitted into the valve body, an annular, second valve seat formed on the valve plunger, a valve element disposed within the valve body and urged by the resilience of a first spring to be seated upon one of the first valve seat and the second valve seat, an input shaft having its one end connected to the valve plunger and its other end connected to a brake pedal, a second spring for positioning the input shaft at its inoperative position, a vacuum valve formed by a combination of the first valve seat and a first seat of the valve element which engages with and disengages from the first valve seat, the first seat of the valve element having a diameter, a constant pressure passage for causing a first space located radially outward of the vacuum valve to communicate with the constant pressure chamber, an atmosphere valve formed by a combination of the second valve seat and a second seat of the valve element which engages with or disengages from the second valve seat, the second seat of the valve element having a diameter, a pressure passage for causing a second space located radially inward of the atmosphere valve to communicate with a source of pressure fluid, and a variable pressure passage for causing a third space located intermediate the vacuum valve and the atmosphere valve to communicate with the variable pressure chamber, the first valve seat of the valve body and the second valve seat of the valve plunger being formed such that both are directed toward a rear end of the valve body, the first and the second seat of the valve element being formed so as to be axially spaced from each other, the first and second seats of the valve element are fixedly coupled with each other for movement in unison in an axial direction, and the diameter of the first seat is nearly equal to the diameter of the second seat.

2. A booster including a tubular valve body slidably disposed within a shell a power piston mounted on the valve body, a constant pressure chamber and a variable pressure chamber defined across the power piston, an annular first valve seat formed around the inner periphery of the valve body, a valve plunger slidably fitted into the valve body, an annular, second valve seat formed on the valve plunger, a valve element disposed within the valve body and urged by the resilience of a first spring to be seated upon one of the first valve seat and the second valve seat, an input shaft having its one end connected to the valve plunger and its other end connected to a brake pedal, a second spring for positioning the input shaft at its inoperative position, a vacuum valve formed by a combination of the first valve seat and a first seat of the valve element which engages with and disengages from the first valve seat, the first seat of the valve element having a diameter, a constant pressure passage for causing a first space located radially outward of the vacuum valve to communicate with the constant pressure chamber, an atmosphere valve formed by a combination of the second valve seat and a second seat of the valve element which engages with or disengages from the second valve seat, the second seat of the valve element having a diameter, a pressure passage for causing a second space located radially inward of the atmosphere valve to communicate with a source of pressure fluid, and a variable pressure passage for causing a third space located intermediate the vacuum valve and the atmosphere valve to communicate with the variable pressure chamber, the first and the second seat of the valve element being formed so as to be axially spaced from each other, and the diameter of the first seat is nearly equal to the diameter of the second seat, the valve element including a cylindrical portion, which is supported by an annular support member disposed inside the cylindrical portion, the cylindrical portion including a radial portion which covers a front end of the support member, the first seat being defined by the inner periphery of the radial portion, the second seat being defined by the inner periphery of a portion which covers the radial portion of the support member at its rear end, an annular muffler member being disposed in the internal space of the support member intermediate the first and the second seat, the second valve seat being formed on a radial portion of the valve plunger which is located at the rear end thereof, the second valve seat moving back and forth inside the annular muffler member so as to be engaged with or disengaged from the second seat.

3. A booster including a tubular valve body slidably disposed within a shell, a power piston mounted on the valve body, a constant pressure chamber and a variable pressure chamber defined across the power piston, an annular, first valve seat formed around the inner periphery of the valve body, a valve plunger slidably fitted into the valve body, an annular, second valve seat formed on the valve plunger, a valve element disposed within the valve body and urged by the resilience of a first spring to be seated upon one of the first valve seat and the second valve seat, an input shaft having its one end connected to the valve plunger and its other end connected to a brake pedal, a second spring for positioning the input shaft at its inoperative position, a vacuum valve formed by a combination of the first valve seat and a first seat of the valve element which enagages with and disengages from the first valve seat, the first seat of the valve element having a diameter, a constant pressure passage for causing a first space located radially outward of the vacuum valve to communicate with the constant pressure chamber, an atmosphere valve formed by a combination of the second valve seat and a second seat of the valve element which engages with or disengages from the second valve seat, the second seat of the valve element having a diameter, a pressure passage for causing a second space located radially inward of the atmosphere valve to communicate with a source of pressure fluid, and a variable pressure passage for causing a third space located intermediate the vacuum valve and the atmosphere valve to communicate with the variable pressure chamber, the first and the second seat of the valve element being formed so as to be axially spaced from each other, and the diameter of the first seat is nearly equal to the diameter of the second seat, a pair of front and rear valve elements which are axially spaced apart from each other and which are axially connected together by a cylindrical support member, the first seat being defined by the inner periphery of the front end of the valve element which covers a radial portion of the support member situated at the front end thereof, the second seat being defined by the inner periphery of a radial portion of the valve element at its rear end which is connected to a rear portion of the support member, the second valve seat being formed on a radial portion of the valve plunger at its rear end, the second valve seat being disposed to move back and forth inside the support member for engagement with or disengagement from the second seat, a pressure chamber being defined by the pair of valve elements, the outer periphery of the support member and the inner periphery of the valve body, the pressure chamber communicating with a space located between both seats which are situated inside the support member through a through-opening formed in the support member.

4. A booster according to one of claim 2 in which the first seat has a diameter which is equal to or slightly greater than the diameter of the second seat.

5. A booster according to claim 3 in which the first seat has a diameter which is equal to or slightly greater than the diameter of the second seat.

* * * * *

UNITED STATES PATENT AND TRADEMARK OFFICE
CERTIFICATE OF CORRECTION

PATENT NO. : 5,697,284
DATED : December 16, 1997
INVENTOR(S) : Masahiro IKEDA

It is certified that error appears in the above-indentified patent and that said Letters Patent is hereby corrected as shown below:

Column 6, line 18; after "shell" insert ---,---.
line 20; after "annular" insert ---,---.

Signed and Sealed this

Twenty-fourth Day of November,1998

Attest:

BRUCE LEHMAN

Attesting Officer          Commissioner of Patents and Trademarks